United States Patent

[11] 3,610,276

| [72] | Inventors | Herbert Seelman<br>Mainaschaff;<br>Rudolf Mundkowski, Aschaffenburg;<br>Anton Wombacher, Goldbach, all of<br>Germany |
|---|---|---|
| [21] | Appl. No. | 865,386 |
| [22] | Filed | Oct. 10, 1969 |
| [45] | Patented | Oct. 5, 1971 |
| [73] | Assignee | Linde Aktiengesellschaft Hildastr<br>Wiesbaden, Germany |
| [32] | Priority | Oct. 14, 1968 |
| [33] | | Germany |
| [31] | | P 18 03 018.7 |

[54] PRESSURE CONTROL VALVE
6 Claims, 4 Drawing Figs.

[52] U.S. Cl. .................................................. 137/469,
137/514.5
[51] Int. Cl. .................................................. F16k 15/00
[50] Field of Search .......................................... 137/469,
477, 514, 514.3, 514.5, 514.7

[56] References Cited
UNITED STATES PATENTS

| 1,231,330 | 6/1917 | Clark | 137/478 |
|---|---|---|---|
| 1,322,938 | 11/1919 | Parker | 137/514.7 |
| 2,318,962 | 5/1943 | Parker | 137/514.5 |
| 2,672,882 | 3/1954 | Bergquist | 137/478 |
| 2,880,751 | 4/1959 | Tobis | 137/478 |
| 2,980,132 | 4/1961 | Prijatel | 137/469 |
| 3,217,740 | 11/1965 | Vick | 137/469 |

*Primary Examiner*—Harold W. Weakley
*Attorney*—Karl F. Ross

ABSTRACT: An automatic pressure control valve in which a valve member is spring biased against a valve seat at a source pressure. The valve member is formed as a plunger or piston and defines with a housing bore a motion-damping chamber connected with the outlet of the valve by a throttling clearance permitting leakage of fluid to and from the outlet side. The face of the plunger confronting the valve seat is of forwardly divergent umbrella configuration around a forwardly projecting closure formation.

INVENTORS,
Herbert Seelmann
Rudolf Mundkowski
BY Anton Wombacher

Karl F. Ross
ATTORNEY

PRESSURE CONTROL VALVE

Our present invention relates to an automatic pressure-regulating, pressure-relieving or pressure-control valve of the type in which a source pressure serves to displace a plunger against a spring and, more particularly, to a valve of this type in which the plunger and valve seat are provided between an inlet port and a large volume chamber directly surrounding the valve seat.

It has already been proposed to provide pressure-relief or pressure-limiting valves adapted to control a high-velocity fluid stream, which is delivered to the valve through an inlet port and passes through the valve into an outlet port, conduit or the like upon the displacement of a valve member in the form of a spring-biased plunger or piston. The degree of displacement of this plunger or piston is proportional to the source pressure and thereby permits greater fluid flow with increased fluid pressure and vice versa. Accordingly, the plunger acts as a pressure-limiting or pressure-control member to maintain a predetermined pressure at an inlet port.

The valve opens at a predetermined pressure and, generally, with increasing throughput, the pressure ahead of the valve member increases so that higher pressures than the valve-opening pressure may arise in the installation which is to be protected by the pressure-relief valve. Thus oscillation of the valve may be produced and lack of control accuracy may result. Furthermore, an additional pressure increase can result from the throttling of large volume fluid streams downstream of the valve. Still another disadvantage of conventional systems is the relatively high cost and complexity of the pressure relief valves of known type, the need to provide pilot or precontrol valves and the tendency of the valve to sustain oscillation with large throughputs of fluid.

It is the principal object of the present invention to provide an automatic pressure-limiting or pressure relief valve wherein the aforementioned disadvantages are obviated and the valve structure is of relatively low cost.

A further object of the instant invention is to provide a self-actuated valve of this general type which does not require a pilot valve and nevertheless is not subject to oscillation.

Still another object of our invention is the provision of an improved pressure relief valve having a predetermined valve-opening pressure, which constitutes the upper pressure limit of the fluid ahead of the valve through a wide range of fluid throughputs.

These objects and others which will be apparent hereinafter are attained, in accordance with the present invention, in a valve structure in which a valve housing is formed within an inlet port, a valve seat surrounding the inlet port and engageable by a plunger or piston-type valve member spring biased in the direction of the seat, and an outlet chamber immediately surrounding the valve seat and of a larger flow cross section than the inlet port, i.e. a relatively large free space adapted to receive fluid upon opening of the valve.

Behind the valve plunger (with respect to the direction of fluid flow) we provide a motion damping or attenuation chamber which is effective in the direction of spring bias and is in fluid communication with the outlet side of the valve through a throttle passage, preferably formed between the valve plunger and the surrounding wall of the bore slidably receiving same with a clearance or play.

The invention makes use of our discovery that, in a system of this type, the pressure in the motion-damping, attenuating or smoothing chamber behind the plunger or valve member is substantially independent of the pressure in the space immediately surrounding the valve seat and in fact is a function substantially only of the rate of displacement of the valve member or plunger, the kinematic viscosity of the fluid in the damping chamber and the width or effective flow cross section of the throttle passage. Thus the pressure perturbations arising in the discharge chamber surrounding the valve seat and resulting from the fluctuations in the fluid flow velocities through the chamber and the static pressures associated therewith, have no effect or only an insignificant effect upon the position of the plunger and the valve member, the position of which is established by the parameters mentioned above and the inlet pressure of the protected source.

According to an important feature of this invention, the valve member is slidably guided in a housing bore of a guide portion of the housing spaced from but confronting the valve seat which is preferably formed as an inwardly extending tubular cylindrical boss on a separate housing but clamped in place in the housing by the guide body.

The valve member or plunger is formed as an axially extending, reduced-diameter stem passing slidably through the guide body and having a free end remote from the valve seat engageable by a spring seat of the spring biasing this valve member or plunger against the seat.

The stem is coaxial with a conical valve-closing formation on the face of the valve member or plunger confronting and aligned with the seat while the plunger has an annular shoulder lying in a plane perpendicular to the axis of the valve mentioned previously. Thus the stem extends from a piston-like head which is slidably displaceable in a cylinderlike bore to define the motion-damping chamber.

Advantageously and in accordance with another important feature of this invention, the throttle passage between the outlet chamber of the valve immediately surrounding the valve seat and the oscillation-damping chamber is constituted at least in part by a slight clearance between the piston part of the valve member or plunger and the surrounding wall of the cylinder bore. Thus, fluid communication between the damping chamber and the outlet side of the valve is effected only via the throttle clearance defined between the periphery of the piston head of the plunger and the wall of the surrounding wall and constricted fluid flow between the damping chamber and the discharge chamber can proceed only via the throttle clearance. The clearance may be formed by machining the cylinder wall of the guide body of the housing and the piston portion of the plunger with corresponding tolerances.

Still another highly important feature of this invention resides in the provision of an inwardly open circumferential groove (i.e. an expansion, fluid distribution or pressure-relieving groove) formed along the inner wall of the guide body and in the wall of the cylinder bore in which the valve member or plunger is received, at a location axially offset from the oscillation-attenuating chamber such that this groove is not uncovered by the piston part of the plunger in any operative position of the latter, for collecting liquid traversing the throttle clearance or delivering liquid to the latter. The position of this groove will, of course, determine the effective length of the throttle passage and thereby permit adjustment of this length in accordance with the desired response of the valve. The groove may be connected with the outlet chamber of the valve by one or more radial bores formed in the guide body of the housing.

The relief groove interposed between the throttling clearance of the motion-damping chamber and the outlet side of the valve is essential in one aspect of the present invention in that it ensures isolation of the attenuation chamber from the perturbations which effect the pressure in the discharge space surrounding the valve seat. In the absence of this relief or isolating groove, the pressure in the space directly surrounding the valve seat would substantially instantaneously be communicated via a throttle clearance into the attenuation chamber. It has already been noted that the space immediately surrounding the valve seat sustains a pressure which is strongly dependent upon the flow velocity or throughput of the fluid stream such that, on the one hand, with increasing flow velocity, the static pressure drops while, with increasing resistance at the outlet side on the other hand, the static pressure increases.

Yet another feature of this invention resides in the construction of the valve plunger or piston such that the stem has the same cross section and diameter as the inlet port at the valve seat. To ensure effective sealing of the valve, we provide a conical formation along the face of the valve member or plunger confronting the valve seat in coaxial alignment with the valve seat. It has been found further that, with respect to the flow of fluid from the valve seat to the outlet of the device, it is advantageous to provide a deflection (change of direction) of the fluid at least in part outwardly and rearwardly in terms of the direction of flow of the fluid through the inlet port. We, therefore, form the valve plunger at its face confronting the valve seat and outwardly of the conical formation of the latter with an outwardly divergent concavity which may be a frustoconical or spheroidal configuration and coaxial with the stem and seating cone, the latter forming an umbrellalike structure with the concave surface. This construction of the deflecting face of the valve member or plunger has been found to increase the independence of the pressure response of the unit from the flow throughput of the fluid.

Upon opening of the valve ("cracking"), when the valve plunger has been urged rearwardly only to a slight degree, the gap between the closure formation of the valve member and the valve seat is relatively small and the flow along the conical formation is significant. A conical stream is thus directed onto the surrounding face of the valve plunger and is deflected via the concavity of the latter relatively sharply to operate upon the valve body in the valve-opening direction and thereby make up for the pressure drop which would otherwise result from the high velocity of liquid past the valve member. As the valve body is urged to an ever increasing distance from the valve seat, the deflection or reversal in direction of flow of the fluid becomes less and less significant as the valve gap increases and the effect of velocity on the static pressure decreases. The above and other objects, features and advantages of the present invention will become more readily apparent from the following description, reference being made to the accompanying drawing in which:

Figure 1:
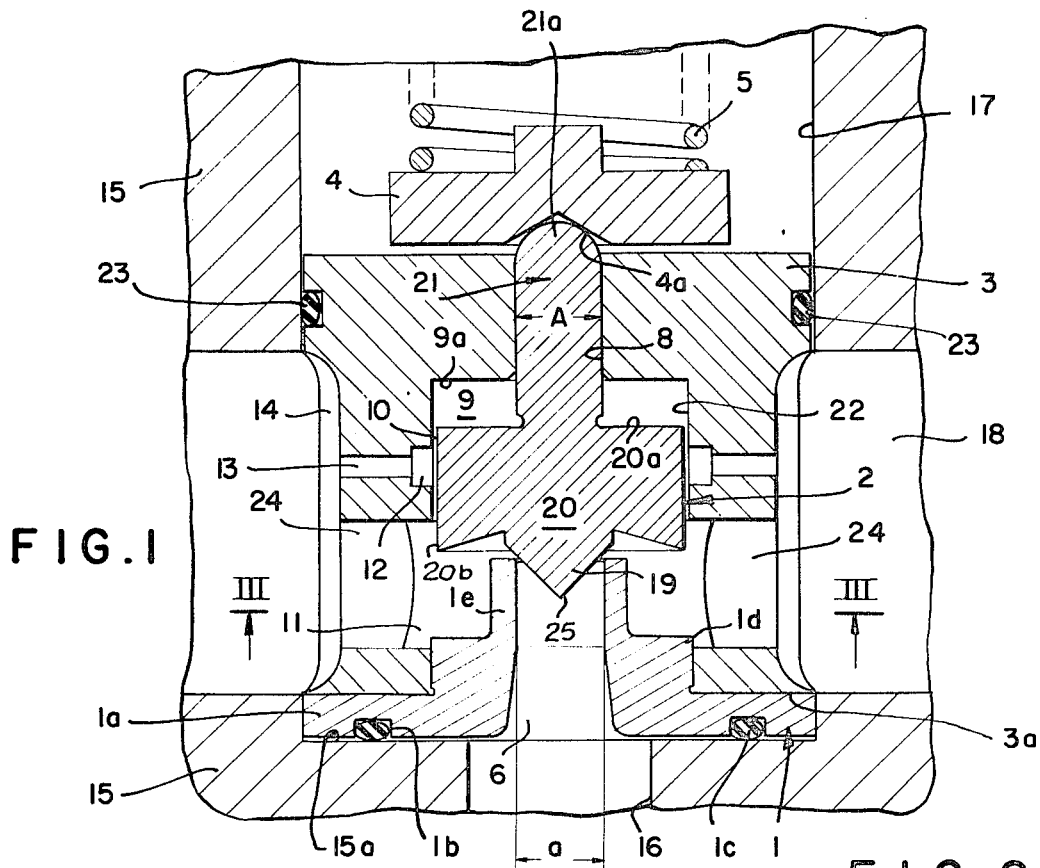
FIG. 1 is a fragmentary cross-sectional view through the valve in one operating position of the latter.
Figure 3:
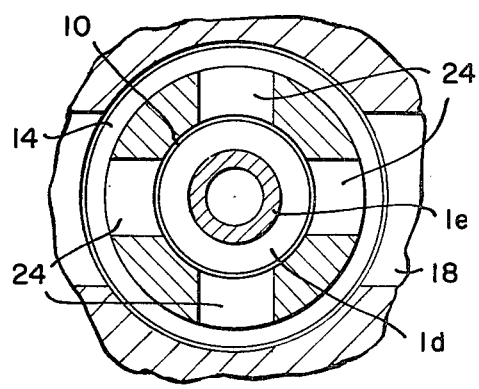
FIG. 3 is a cross-sectional view taken along the line III—III of FIG. 1.

In the drawing, we show a valve comprising a valve housing 15 having a vertically extending bore 17 communicating with an inlet port 16 at a shoulder 15a. Within this housing there is provided, in the form of an insert, a cylindrical valve body 3 sealed against the wall of the bore 17 by an O-ring 23. The base 3a of this guide body bears against an outwardly extending flange 1a of a valve seat 1 which rests against the shoulder 15a and has an annular groove 1b receiving a sealing ring 1c under compression.

The valve seat 1 is further provided with an annular step 1d snugly received in the base 3a of the guide body 3 and coaxial with the bores 16 and 17 and with the body 3. From the step 1d, there extends coaxially a tubular cylindrical boss 1e, the inner lip 1f of which is engageable by the conical formation 19 of a valve body generally designated at 2. The interior of the valve seat is hollow as represented at 6 to define a flow cross section as represented by the area a.

The valve member 2 forms a plunger slidably received in a coaxial bore 8 of the housing body 3 and is, for this purpose, formed with a stem 21 axially aligned with the bore 6 and having a diameter and cross section A corresponding to that represented at a. The dome-shaped end 21a extending beyond the guide body 3 is received in a conical recess 4a of a pressure plate 4 which is held by a coil spring 5 against vertical movement.

Figure 4:
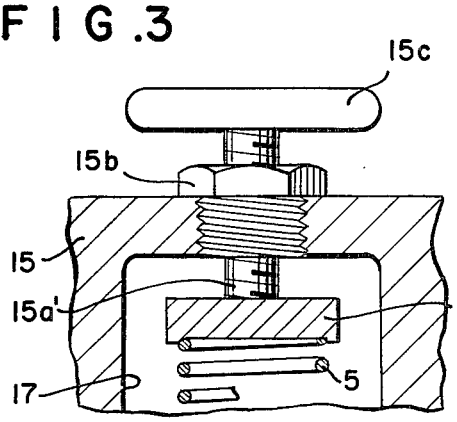
FIG. 4 is a detail view illustrating another aspect of the valve of the present invention.

As shown in FIG. 4, the other end of the coil spring may bear against a plate 5a which can be shifted vertically relative to the housing 15 by a spindle 15a' threadedly received in a plug 15b which, in turn, is threaded into the housing 15 to close the bore 17, the latter being vented in a manner not shown. The handle 15c of the spindle 15a may be rotated to adjust the precompression or spring bias with which the spring is applied to the plate 4.

The guide body 3 is, moreover, provided with an annular compartment 11 immediately surrounding the valve seat 1f with clearance so that the fluid may flow freely into this space 11 before flowing via a multiplicity of radial bores 24 into the discharge chamber 14 surrounding the body 3 and radial outlet passages 18.

Within the upper part of the body 3, there is provided a cylinder bore 22 in axial alignment with the bore 8 but somewhat wider than the latter and in which is slidably received the piston head 20 of the valve member 2. A shoulder 20a defines with the upper wall 9a of the bore 22, the oscillation-damping chamber 9 which communicates via a throttle gap 10 between the wall 22 and the outer wall 20b of the valve member. The throttle gap 10 communicates via a relief or discharge chamber 12 and a plurality of radial passages 13 with the discharge chamber 14, the latter having a configuration of annular groove in the exterior of the guide body 3 as previously mentioned. The annular chamber 12 is, moreover, formed as an inwardly open circumferential recess or groove.

Figure 2:
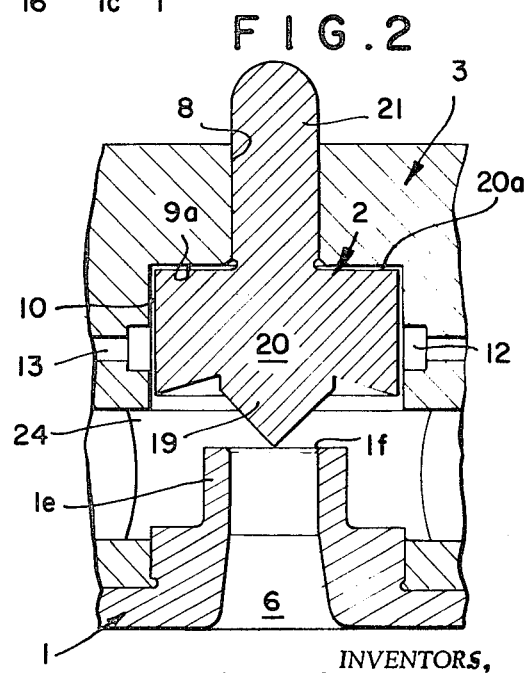
FIG. 2 is a similar view showing a further operative position.

At its forward end (downward in FIGS. 1 and 2) the valve member 2 is provided with an outwardly divergent (concave) frustoconical deflecting face in the shape of an umbrella adapted to form a smooth deflected curtain of the fluid emerging from the bore 1e. While the frustoconical configuration is desired as illustrated in FIGS. 1 and 2, the present invention also contemplates a system in which the concavity is generally spheroidal. The conical portion 19 or the closure part of the valve member 2 has the conical surface designated at 15 and terminates somewhat ahead of the deepest part of the deflecting surface 7 in an axial offset or step 19a.

When the pressure at the inlet port 16 and the valve seat passage 6 exceeds the corresponding force of spring 5, the valve body 2 is shifted against the spring 5 upwardly into an open condition as shown, for example, in FIG. 2. The upward movement of the valve member 2 results in a displacement by the piston head 20 of fluid within the motion-damping chamber 9 and thereby forces the fluid from this chamber through the throttle gap 10. The fluid then enters the outlet chamber 14 via the depressurization groove 12 and the bore 13. In the steady state of the device the same pressure exists in the outlet ducts 18 as in chamber 9. However, any fluctuations in the pressure in these ducts resulting from variations in flow rate are damped in the bores 13 and groove 12 interposed between the outlet side of the valve and the throttle gap 10.

When the valve is cracked initially, the position of the valve member 2 is that illustrated in FIG. 1. Consequently, the fluid flows upwardly and outwardly along the conical surface 25 of closure portion 19 and opens into the chamber 11 while being directed against the frustoconical or concave surface 7 which lies generally transverse to the surface 25 in the direction of flow of the fluid. With a narrowing of the gap between the surface 25 and the seat edge 1f, the angular deflection of the fluid is increased, thereby providing a resultant force at the surface 7 in the upward direction to compensate any static pressure drop in the region immediately ahead of member 2. The narrower the gap, the sharper is the stream impinging upon the deflection surface 7. As the valve member 2 is urged away from the valve seat into its highest position, the liquid flows from the bore 6 against the conical surface 25 and is deflected by this surface and against the surface 7 substantially uniformly so that the deflection surface is subjected to a high-velocity, uniform flow. The bore 22 can be widened at the motion-damping chamber so that the length of the throttle gap from the chamber to the groove 12 can be independent of the position of the valve body 2 and the throttle gap can also be made to have an increasing aperture with greater length and vice versa.

We claim:

1. An automatic pressure-limiting valve, comprising:
   a housing formed with an inlet port and an outlet:
   a valve seat in said housing communicating with said inlet port:

a valve member received in said housing and spring biased in the direction of said valve seat, said valve member defining with said housing a motion-damping chamber of a volume reduced upon displacement of said valve member from said valve seat;

means forming a throttle passage between said outlet and said damping chamber, said housing being provided with a bore coaxial with said inlet port and said outlet extending transversely to said bore;

a guide body received in said bore and coaxially surrounding said valve seat, said valve seat projecting axially into said guide body, said damping chamber being formed in said guide body and being provided with a cylinder bore coaxial with said seat and receiving said valve member with a clearance defining said throttle passage, said guide body being provided alone said cylinder bore between said damping chamber and said outlet with at least one circumferential relief groove communicating with said outlet;

an axially extending stem on said valve member remote from said valve seat and passing slidably through said guide body: and a spring bearing upon said stem axially in the direction of said seat; said stem having substantially the same cross section as the interior of said seat.

2. The valve defined in claim 1 wherein said valve member has a face confronting said valve seat and provided with a formation received therein.

3. The valve defined in claim 2 wherein said formation a conical tip, said face being further provided with a flow-deflecting concave surface diverging in the axial direction of said outlet and surrounding said tip in an umbrellalike configuration.

4. An automatic pressure-limiting valve comprising a housing formed with an inlet port and an outlet, a valve seat communicating with said inlet port, and a valve member received in said housing and spring biased in the direction of said valve seat, said valve member being provided with a face confronting said valve seat and provided with an axially extending closure formation received therein and conically converging in the direction of said seat, and provided further with a flow-deflecting surface concave in the direction of said seat and surrounding said formation while diverging axially in the direction of said seat in an umbrellalike configuration, said housing defining an annular space around said seat and ahead of said surface in the direction of said seat, said outlet communicating with said annular space at a location ahead of said surface, said formation being generally conical and said surface being axially set back from said formation at the region at which it engages said seat.

5. The valve defined in claim 4 wherein said surface is a frustocone and said valve seat is formed with a boss extending axially in the direction of said face.

6. The valve defined in claim 4, further comprising means forming a motion-damping chamber with said valve member of a volume reduced upon displacement of said valve member from said valve seat, and a throttle passage between said valve member and said housing connecting said motion-damping chamber with said outlet.